United States Patent Office 3,822,233
Patented July 2, 1974

3,822,233
SYNERGISTIC ORGANOTIN STABILIZER COMPOSITIONS AND RESINS STABILIZED THEREWITH
Christian H. Stapfer, Newtown, Pa., assignor to Cincinnati Milacron Chemicals Inc., Reading, Ohio
No Drawing. Continuation-in-part of application Ser. No. 780,888, Dec. 3, 1968, now Patent No. 3,630,993, dated Dec. 28, 1971. This application Oct. 13, 1971, Ser. No. 189,038
Int. Cl. C08f 45/62
U.S. Cl. 260—45.75 K     10 Claims

ABSTRACT OF THE DISCLOSURE

An improved stabilized composition comprises a synergistic combination of an organic thioanhydride and a monohydrocarbyl tin compound of the formula $$R^3Sn(Z)_n(Z^1R^4)_{3-2n}$$

wherein $R^3$ is a hydrocarbyl radical having 1 to 12 carbon atoms, Z and $Z^1$ are either oxygen or sulfur, $R^4$ is hydrogen or an organic radical bonded to $Z^1$ by a carbon atom and $n$ is a number from 0 to 1.5 varying in increments of ½.

Halide containing resins stabilized with these compositions exhibit improved resistance to the development of early color during processing.

---

This invention is a continuation-in-part of my copending application Ser. No. 780,888, filed Dec. 3, 1968, now U.S. Pat. No. 3,630,993.

This invention relates to organotin stabilizers and halide containing resins stabilized therewith. More particularly, the invention relates to synergistic combination of organic thioanhydrides with monohydrocarbyltin compounds which reduces the development of early color during processing when incorporated as a stabilizer in halogen containing resins.

During recent years the use of thioanhydrides corresponding to the formula

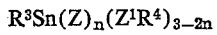

wherein $R^1$ and $R^2$ are independently selected hydrocarbon groups with 6 to 20 carbon atoms, have been contemplated as stabilizers against the thermal decomposition of halogen containing resins, and particularly polyvinyl chloride. These thioanhydrides are desirable because they exhibit good long term stabilizing efficacy for both plasticized and rigid formations, but they have never gained commercial importance because of the substantial discoloration of polymers which occurs during processing. The discoloration is unrelated to the stabilizing properties of the thioanhydrides; however, it severely restricts the commercial use because of the serious detraction from the esthetic appeal of products.

I have discovered that organic thioanhydrides containing small amounts of monohydrocarbyltin compounds corresponding to the formula $R^3Sn(Z)_n(Z^1R^4)_{3-2n}$ wherein $R^3$ is a hydrocarbyl group containing 1 to 12 carbon atoms, Z and $Z^1$ are independently selected from oxygen and sulfur, $R^4$ is hydrogen or an organic radical bonded to $Z^1$ by a carbon atom and $n$ is a number from 0 to 1.5 varying in increments of ½ overcome the disadvantages of the prior art.

Suitable thioanhydrides for practicing the present invention include those where $R^1$ and $R^2$ are the same or different alkyl or aryl radicals. The alkyl radicals may be straight chain radicals producing anhydrides such as thiolauric or thiostearic anhydride; branched chain radicals producing anhydrides such as 1-thio-2-ethylhexoic anhydride and unsaturated alkyl radicals such as those producing thio crotonic anhydride. The aryl radicals suitable for practicing the present invention include unsubstituted aryl producing anhydrides such as thiobenzoic anhydride or alkyl substituted aryl radicals producing thioanhydrides such as 2-tert.butylthiobenzoic anhydride. An example of suitable thioanhydrides which have different $R^1$ and $R^2$ groups is thiolauricbenzoic anhydride.

The monohydrocarbyl tin compounds suitable for arresting the development of early color in halogen containing resins stabilized with organic thioanhydrides include stannoic oxides, stannoic sulfides, stannoic acids and thiostannoic acids having one hydrocarbyl group attached to the tin atom. The hydrocarbyl group preferably contains 1 to 12 carbon atoms and may be an alkyl, aryl, alkaryl or aralkyl radical except butyl thiostannoic acid or butyl tin sulfide. Examples of this group of compounds include methylstannoic acid, methylthiostannoic acid, butyl stannoic acid, butyl tin oxide, n-octyl stannoic acid, isooctyl stannoic acid, n-octyl thiostannoic acid, isooctyl thiostannoic acid and phenyl stannoic acid. These compounds frequently exist in the form of polymers which are condensation products of the above stannoic and thiostannoic acids as well as mixtures of stannoic and thiostannoic acids. The condensation products may contain 2 to 1000 repeat units and generally contain 2 to 100 repeat units corresponding to the formula $[R^3Z_n]_y$ wherein Z is oxygen, sulfur or a mixture of oxygen and sulfur, $n$ equals 1.5 and $y$ denotes the degree of polymerization such as methyltin sulfide and octyltin sulfide.

Monohydrocarbyl tin compounds suitable for practicing the present invention include compounds where $R^4$ is a hydrocarbon radical, preferably alkyl, having 1 to 12 carbon atoms. Some examples of suitable compounds include the methyl, butyl, n-octyl and isooctyl esters of both monohydrocarbyl stannoic and thiostannoic acids such as the isooctyl ester of butylstannoic acid and compounds of the formula $R^3Sn(SR^4)$ such as methyltin tris (lauryl mercaptide), butyl tin tris (stearyl mercaptide) and octyl tin tris (stearyl mercaptide).

The monohydrocarbyl tin compounds can also have a functional group attached to $Z^1$ by a carbon atom and are useful in practicing the present invention. Functional groups of this type include

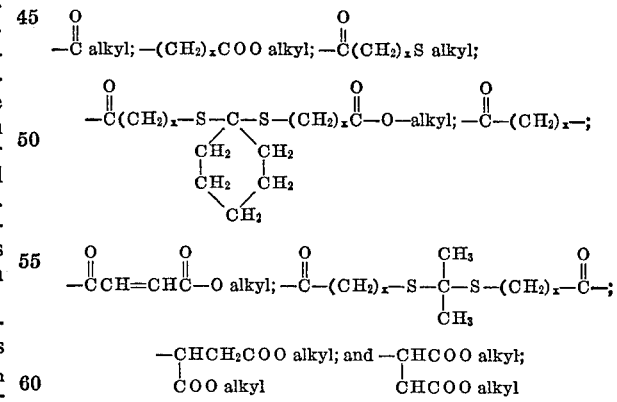

wherein $x$ is 1 to 3. Some examples of monohydrocarbyl tin compounds containing these groups are monomethyltin tris(isoctyl mercaptoacetate), monomethyltin tris (isooctyl mercaptopropionate), monobutyltin tris (isooctyl mercaptoacetate), monobutyl tin tris (isooctyl mercaptopropionate), monobutyltin tris (isooctyl-3-mercapto butyrate), methyltin tris (isooctyl) maleate), monobutyltin tris (isooctyl maleate), octyltin tris (isooctyl maleate), methyltin trialaurate, butyltin tristearate, octyltin tristearate, and monobutyl tin tris [cyclohexylidene bis (thio propionic acid) monobutyl ester]. Some examples of monohydrocarbyl compounds having Z and $Z^1$ unalike are bis [monobutyltin di(isooctyl mercaptoacetate) oxide, poly [mercaptopropionate di(butylstannoxy)], bis (monobutyl tin diisooctylmercapto propionate) oxide and poly-[butyl stannoxy cyclohexylidene bis (thiopropionate)].

The preferred monohydocarbyl compounds for practicing the present invention are those which correspond to one of the following formulae:

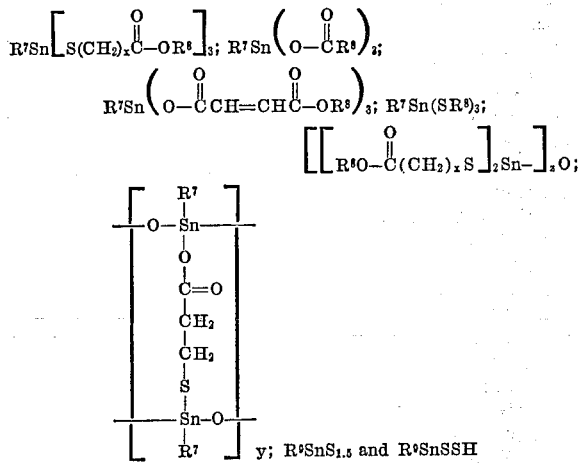

wherein $R^7$ is an alkyl having 1 to 12 carbon atoms, $R^8$ is an alkyl having 1 to 20 carbon atoms, $R^9$ is an alkyl having 1 to 3 or 5 to 12 carbon atoms, $x$ is 1 or 2 and $y$ is 2 to ∞. It is noted that butyl tin sulfide and butyl thiostannoic acid do not form synergistic stablizer combinations with thioanhydrides. It is one of applicant's discoveries that the remaining alkyl tin sulfides and alkyl thiostannoic acids are unlike butyl tin sulfide or butyl thiostannoic acid.

The monohydrocarbyl tin compounds are generally used in amounts varying from 1 to 25 weight percent of the thionhydride in stabilizers of the present invention usually 2.5 to 15 weight percent and preferably in amounts of 4 to 12 weight percent. The synergistic stabilizers of the present invention are generally incorporated into a resin in amounts of 0.1 to 10 weight percent and preferably from 0.5 to weight percent.

The synergistic action of the monohydrocarbyl tin compounds of the present invention is demonstrated to be unexpected in view of the poor results obtained when di- and trialkyl tin compounds are combined with organic thioanhydride stabilizers.

Resins which may be stabilized by the synergistic composition of the present invention include both rigid and plasticized formulations of halogen containing polymers particularly polyvinyl chloride and vinylidene chloride, copolymers of halogen containing resins with ethylenically unsaturated compounds such as, copolymers of vinyl acetate and vinyl chloride and the like.

The following examples are presented to demonstrate several embodiments of the present invention as well as several embodiments of the invention claimed in my above-mentioned patent and are not to be considered as limitations thereon.

EXAMPLE 1

Three formulations were prepared. Each formulation contained 100 parts Geon 103P (a general purpose polyvinyl chloride resins suspension manufactured by the B. F. Goodrich Company), 0.5 parts of mineral oil and a total of 2 parts of the stabilizer as indicated in Table 1. Each formulation was processed on a two roll mill at 320° F. for five minutes and then divided into a number of 1" x ½" x ⅛" samples, the samples of each formulation were then placed in an air circulatory oven at 370° and a sample of each formulation was removed from the oven at 10 minute intervals over an interval of one hour. Formulations 1 and 2 were tested for comparative purposes and do not represent embodiments of the present invention. Table 1 reports the composition of the stabilizers tested. First discoloration represents the time at which visually detectable discoloration of the test sample was first noticed and moderate discoloration represents the time at which an orange or red discoloration was observed while decomposition was observed as very dark red, brown or black color in the sample.

TABLE 1

| No. | Stabilizer composition in parts (p.) of formulation | First discoloration | Moderate discoloration | Thermal decomposition |
|---|---|---|---|---|
| 1 | 2.0 p. thiolaural anhydride | | 10 | 20 |
| 2 | 2.0 p. methyl tin sulfide | *0 | 20 | 40 |
| 3 | 1.9 p. thiolauric anhydride, 0.1 p. methyl tin sulfide. | 30 | 40 | 50 |

*Repeating this test using stearic thioanhydride or benzoic thioanhydride produces substantially the same synergistic improvement in comparison with either of the components alone.

EXAMPLE 2

Formulations, each containing 100 parts of PVC 40 (a general purpose polyvinyl chloride resin manufactured by the Diamond-Shamrock Corp.), 25 parts dioctylphthalate, 5 parts epoxidized soybean oil, 0.25 parts stearic acid and 2 parts of the respective stabilizers as indicated in Table 2, were milled, divided and exposed according to the procedure described in Example 1. The results of the tests are reported in Table 2.

TABLE 2

| No. | Stabilizer composition in parts (p.) of formulation | First discoloration | Moderate discoloration | Substantial discoloration |
|---|---|---|---|---|
| 1¹ | 2.0 p. thiolauric anhydride | (²) | 10 | 20 |
| 2 | 1.9 p. thiolauric anhydride, 0.1 p. methyltin tris (isooctyl mercaptopropionate). | 30 | 40 | 50 |
| 3¹ | 2.0 p. methyltin tris (isooctyl mercaptopropionate). | 10 | 20 | 40 |
| 4 | 1.9 p. thiolauric anhydride, 0.1 p. butyltin tris (isooctyl mercaptoacetate). | 30 | 50 | 50 |
| 5¹ | 2.0 p. butyltin tris (isooctyl mercaptoacetate). | 10 | 30 | 40 |
| 6 | 1.9 p. thiolauric anhydride, 0.1 p. butyltin tris (isoocytl maleate). | 20 | 40 | 50 |
| 7¹ | 2.0 butyltin tris (isooctyl maleate) | 5 | 10 | 20 |
| 8 | 1.9 p. thiolauric anhydride, 0.1 p. octyltin tristearate. | 20 | 30 | 40 |
| 9¹ | 2.0 p. octyltin tristearate | 10 | 20 | 30 |
| 10 | 1.9 p. thiolauric anhydride, 0.1 p. octyltin tris (lauryl mercaptide). | 30 | 40 | 50 |
| 11¹ | 2.0 p. octyltin tris (lauryl mercaptide). | 15 | 25 | 40 |

¹ These tests are not according to the present invention and are presented only for comparative purposes.
² Yellowing began during milling.

EXAMPLE 3

Eight formulations were prepared as described in Example 2 for the respective stabilizers as indicated in Table 3 and the formulations were processed in the same manner described in Example 1 except over exposure was extended thirty minutes. The following table reports the results of the test with formulations 1 and 5 not being embodiments of the present invention and included for comparative purposes only and with formulations 2-4 and 6-8 illustrating the invention claimed in my above-mentioned patent.

TABLE 3

| No. | Stabilizer composition in parts (p.) | Time in minutes to— | | |
|---|---|---|---|---|
| | | Very slight discoloration | Moderate discoloration | Thermal degradation |
| 1 | 2 p. thiostearic anhydride | (1) | (2) | 10 |
| 2 | 1.9 thiostearic anhydride, 0.1 butylstannoic acid | 10 | 30 | 90 |
| 3 | 1.9 p. thiostearic anhydride, 0.1 p. methyl stannoic acid | 10 | 90 | |
| 4 | 1.9 p. thiostearic anhydride, 0.1 p. phenylstannoic acid | 10 | 60 | 80 |
| 5 | 2 p. thiobenzoic anhydride | | 10 | 90 |
| 6 | 1.9 p. thiobenzoic anhydride, 0.1 butylstannoic acid | 10 | 60 | |
| 7 | 1.9 p. thiobenzoic anhydride, 0.1 p. methyl stannoic acid | 10 | 50 | |
| 8 | 1.9 p. thiobenzoic anhydride, 0.1 phenylstannoic acid | 20 | 80 | 90 |

1 Slight yellowing developed during milling.
2 Very strong discoloration after 10 minutes, decomposition at 80 minutes.

EXAMPLE 4

Three formulations were prepared containing 100 parts of PVC 40 (a general purpose polyvinyl chloride resin manufactured by the Diamond-Shamrock Corp.), 25 parts dioctylphthalate, 5 parts epoxidized soy bean oil, 0.25 parts stearic acid and 2 parts of the respective stabilizers listed in Table 2 were milled, divided and exposed according to the procedure described in Example 1 except that the oven exposure was conducted for 90 minutes. The results of this test are reported in Table 4 with formulation 2 being according to the present invention and formulation 1 and 3 not being embodiments of the present invention claimed in my above-mentioned patent and included for comparative purposes to demonstrate the synergistic effect of the stabilizers of the present invention.

TABLE 4

| No. | Stabilizer composition in parts (p.) | Time in minutes to— | | |
|---|---|---|---|---|
| | | Very slight discoloration | Moderate discoloration | Thermal degradation |
| 1 | 2 p. thiolauric anhydride | 10 | 20 | 90 |
| 2 | 1.9 p. thiolauric anhydride, 0.1 p. butylstannoic acid | | 50 | |
| 3 | 0.1 p. butylstannoic acid | (*) | 10 | 50 |

*Slight yellowing began during milling.

EXAMPLE 5

Six formulations more rigid than those of Examples 1–4 were prepared by mixing 100 parts of Opalan 630 (a suspension of polyvinyl chloride manufactured by Monsanto Corporation), 10 parts dioctylphthalate, 5 parts epoxidized soy bean oil and 0.2 part of stearic acid and 2.0 parts of the stabilizer as indicated in Table 5 was processed according to the procedure described in Example 1. Table 5 reports the results of this test. Formulation 1 is not an embodiment of the present invention and is included for comparative purposes only. Formulations 2–4 represent embodiments of the invention clamed in my above-mentioned patent.

TABLE 5

| No. | Stabilizer composition in parts (p.) | Time in minutes to slight discoloration |
|---|---|---|
| 1 | 2 p. thiolauric anhydride | (*) |
| 2 | 1.9 p. thiolauric anhydride, 0.1 p. monobutyltin tris [cyclohexylidene bis (thiopropionic acid) monobutyl ester] | 30 |
| 3 | 1.9 p. thiolauric anhydride, 0.1 p. poly[butyl stannoxy cyclohexylidene bis (thiopropionate)] | 30 |
| 4 | 1.9 p. thiolauric anhydride, 0.1 p. butyl stannoic acid | 30 |
| 5 | 1.9 p. thiolauric anhydride, 0.1 p. monobutyltin sulfide | 20 |
| 6 | 1.9 p. thiolauric anhydride, 0.1 p. monobutyltin tris (isooctylmercapto propionate) | 20 |

*Developed during milling.

The formulation stabilized with thiolauric anhydride alone developed early color during the milling operation and had a distinct yellow color after 20 minutes of oven exposure while all formulations containing stabilizers of the present invention did not develop early discoloration until 20 minutes of exposure to heat.

EXAMPLE 6

The procedure of Example 5 was followed to prepare four formulations except that the amount of butylstannoic acid used as the co-stabilizer with thiolauric anhydride was varied between 0 and 7.5 weight percent based on the thiolauric anhydride. Each formulation contained 2.0 parts thiolauric anhydride and the following table reports results of the above test for each formulation. Formulation 1 does not represent the present invention and formulations 2–4 represent the invention claimed in my above-mentioned U.S. patent.

TABLE 6

| Formulation | Amount of butyl stannoic acid in part per 100 | Time minutes to slight discoloration |
|---|---|---|
| 1 | 0 | (*) |
| 2 | 0.05 | 20 |
| 3 | 0.1 | 30 |
| 4 | 0.15 | 20 |

*Developed slight yellow color during milling.

EXAMPLE 7

Six formulations were prepared according to the procedure of Example 6 except that monobutyltin tris [cyclohexylidene bis (thiopropionic acid) monobutyl ester] was substituted for the butyl stannoic acid in Example 6 and the tests were extended to formulations containing up to 20 percent of the monobutyltin tris [cyclohexylidene bis (thiopropionic acid) monobutyl ester]. The results of this test are reported in Table 7 and formulation 1 is not according to the present invention but included for comparison purposes only. Formulations 2–6 illustrate the invention claimed in my above-mentioned patent.

TABLE 7

| Formulation | Amt. of co-stabilizer in part per 100 | Time to first discoloration |
|---|---|---|
| 1 | 0 | (*) |
| 2 | 0.05 | 30 |
| 3 | 0.1 | 30 |
| 4 | 0.15 | 30 |
| 5 | 0.2 | 20 |
| 6 | 0.3 | 20 |

*Slight yellowing developed during milling.

EXAMPLE 8

Four formulations of 100 parts PVC 40, 25 parts dioctyl phthalate, 5 parts epoxidized soy bean oil, 0.25 parts of stearic acid, 1.9 parts thiolauric anhydride and 0.1 part of the stabilizer as indicated in Table 8 were processed according to the procedure of Example 1. The results of the test are reported in Table 8. Formulation 1 illustrates the invention claimed in my above-mentioned patent and formulations 2–4 do not represent the present invention or the invention claimed in my above-mentioned U.S. patent.

TABLE 8

| Formulation | Stabilizer composition | First color | Serious degradation |
|---|---|---|---|
| 1 | Butyl stannoic acid | 40 | 90 |
| 2 | Dioctyl tin bis (isooctyl thioglycolate) | 10 | 80 |
| 3 | Dioctyl tin maleate | 10 | 80 |
| 4 | Bis tributyl tin oxide | 0 | 50 |

The test of Example 8 clearly demonstrates that only monohydrocarbyl tin compounds produce the synergistic results obtained by the stabilizers of the present invention.

What is claimed is:

1. A stabilizing composition for vinyl halide resins selected from the group consisting of polyvinyl chloride, polyvinylidene chloride, copolymers of vinyl chloride and vinylidene chloride, copolymers of vinyl chloride with other ethylenically unsaturated monomers and mixtures thereof comprising a synergistic combination of (1) a thioanhydride corresponding to the formula

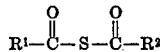

wherein $R^1$ and $R^2$ are hydrocarbyl radicals containing 6 to 20 carbon atoms and (2) 2.5 to 15 weight percent based on said thioanhydride, a monohydrocarbyltin compound corresponding to a formula selected from the group consisting of

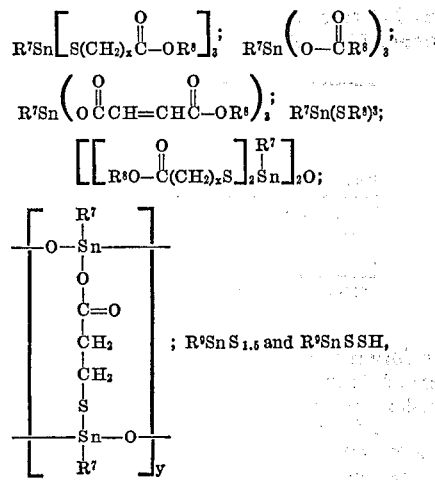

; $R^8SnS_{1.5}$ and $R^8SnSSH$, wherein $R^7$ is an alkyl having 1 to 12 carbon atoms, $R^8$ is an alkyl having 1 to 20 carbon atoms; $R^9$ is an alkyl having 1 to 3 or 5 to 12 carbon atoms, $x$ is 1 or 2 and $y$ is at least 2.

2. The stabilizing composition of claim 1 wherein (1) is selected from the group consisting of thiolauric anhydride, thiostearic anhydride and thiobenzoic anhydride and (2) is selected from the group consisting of methyltin tris (isooctyl mercaptopropionate), butyltin tris (isooctyl mercaptoacetate), octyltin tristearate, butyltin tris (isooctyl maleate), octyltin tris (lauryl mercaptide), bis (butyltin diisooctyl mercaptopropionate)oxide, methyltin sulfide and methylthiostannoic acid.

3. The stabilizing composition of claim 2 wherein (2) is 4 to 12 weight percent methyltin tris (isooctyl mercaptopropionate).

4. The stabilizing composition of claim 2 wherein (2) is 4 to 12 weight percent butyltin tris (isooctyl mercaptoacetate).

5. The stabilizing composition of claim 2 wherein (2) is 4 to 12 weight percent methyltin sulfide.

6. The stabilizing composition of claim 2 wherein (2) is 4 to 12 weight percent methylthiostannoic acid.

7. The stabilizing composition of claim 2 wherein (2) is 4 to 12 weight percent butyltin tris (isooctyl maleate).

8. The stabilizing composition of claim 2 wherein (2) is 4 to 12 weight percent octyltin tris (lauryl mercaptide).

9. The stabilizing composition of claim 2 wherein (2) is 4 to 12 weight percent octyltin tristearate.

10. A polyvinyl chloride resin stabilized with 0.1 to 10% of the stabilizing composition of claim 1.

References Cited
UNITED STATES PATENTS

| | | | |
|---|---|---|---|
| 3,413,264 | 11/1968 | Hechenbleikner | 260—45.75 |
| 2,726,227 | 12/1955 | Leistner | 260—45.75 |
| 3,222,317 | 12/1965 | Kauder | 260—45.75 |
| 3,021,302 | 2/1962 | Frey | 260—45.75 |
| 2,648,650 | 8/1953 | Weinberg | 260—45.75 |
| 3,461,091 | 8/1969 | Stamm | 260—45.75 |

HOSEA E. TAYLOR, Primary Examiner

V. P. HOKE, Assistant Examiner

U.S. Cl. X.R.

252—406; 260—23 X A, 45.7 S